Jan. 6, 1948.  W. W. SINGLETON  2,434,232
GRILLE
Filed June 29, 1945

INVENTOR.
WILLIAM W. SINGLETON
BY
ATTORNEY

Patented Jan. 6, 1948

2,434,232

UNITED STATES PATENT OFFICE 2,434,232

GRILLE

William W. Singleton, Detroit, Mich., assignor to Bendix Aviation Corporation, Detroit, Mich., a corporation of Delaware Application June 29, 1945, Serial No. 602,389

1 Claim. (Cl. 154—129)

This invention relates to grilles, and more particularly to grilles used as the central components of composite panels.

An object of the invention is to provide a grille of expanded or perforated metal.

Another object of the invention is to utilize expanded metal for grille formation so as to eliminate material wastage and effect an economic saving.

A further object of the invention is to provide a unitary grille structure requiring no welding or other attaching means for the formation thereof.

And yet another object of the invention is to provide a strong unitary grille structure for composite panels capable of readily sustaining compound curvatures.

Other objects and advantages of the invention will be apparent from the following description taken in conjunction with the drawing forming a part of this specification, and in which.

Figures 1, 2, 3:
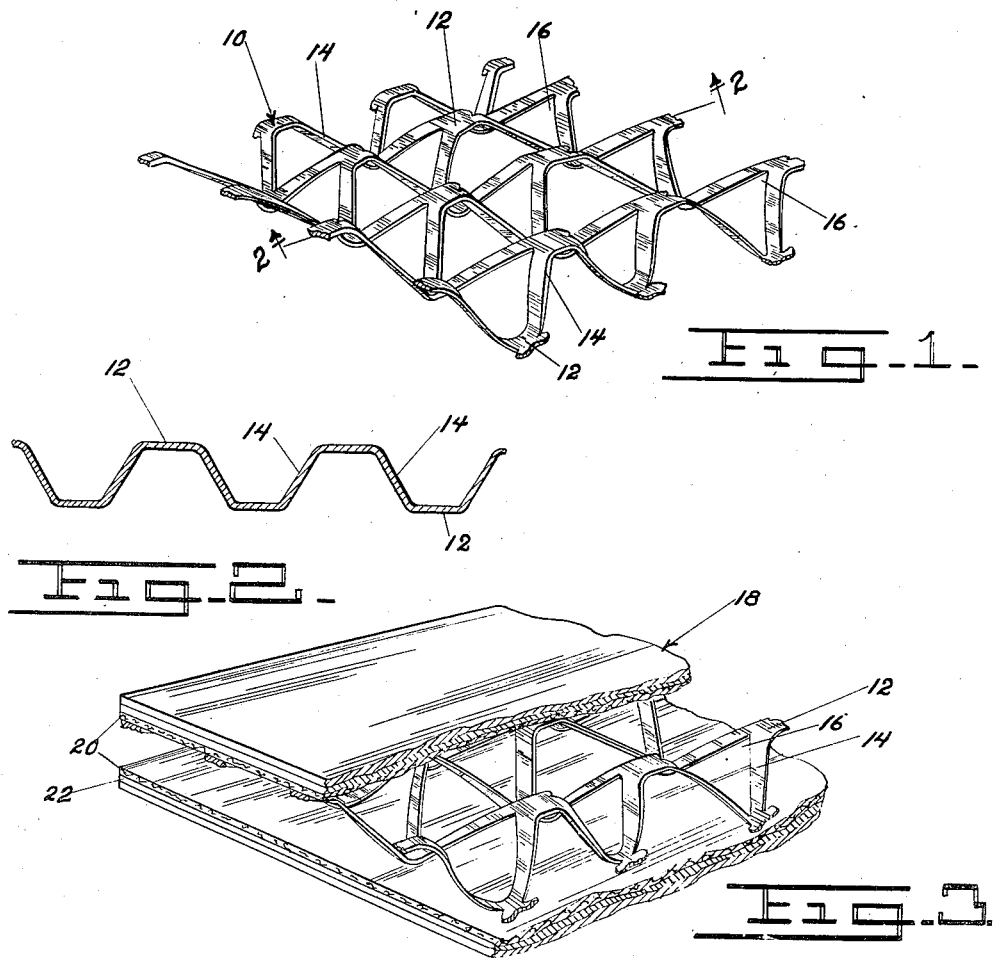
Fig. 1 is a view in perspective of the grille embodied in the invention.
Fig. 2 is a sectional view along the lines 2—2 of Fig. 1.
Fig. 3 is a view in perspective partly broken away showing the grille in a composite panel.

Referring to the drawing for more specific details of the invention, a grille indicated generally at 10, made by deforming a sheet of conventional expanded metal, comprises a plurality of flat parallel surfaces 12 equally distributed between two parallel separated planes. Each of the surfaces 12 is bifurcated at two opposite edges thereof providing distended angularly inclined members 14 with an included angle 16 between any two of the members leading from the same edge of a surface 12. The inclined members 14 lead downwardly and outwardly to the surfaces 12 in the other of the two parallel planes.

Laminae, indicated generally at 18, of any feasible material may be superimposed on both faces of the grille and bonded thereto by suitable adhesives. For example, a layer of fabric 20, suitably impregnated with a bonding adhesive of a thermoplastic-thermosetting resin mixture, providing a strong metal to fabric bond, may be bonded under heat and low pressure to the grille 10, and other layers 22 of paper stock suitably impregnated with a modified thermosetting resin may be bonded to the fabric under heat and low pressure.

The resultant composite panel has high strength in all directions as a result of the reinforcing characteristics of the grille 10, said grille being particularly strong in both diagonal directions.

In those cases where a panel having either simple or compound curvature is desired, the grille is first deformed to the required shape and the laminae are bonded to the curved grille.

The conventional manner of grille formation comprising the stamping, punching, or slotting, and then the deforming of a sheet of metal results in the production of a grille weighing considerably less than the original sheet of metal. The difference represents metal loss in stamping or other operations preparatory to deformation.

The use of expanded metal eliminates metal loss since the resultant grille weighs the same as the original sheet of metal.

While this invention has been described in connection with certain specific embodiments, the principle involved is susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is:

A method of manufacturing a composite panel comprising providing an expanded metal grille of substantial depth, bonding fabric to both faces of the grille with suitable adhesive under the influence of heat and bonding sheet paper to the fabric with a suitable adhesive under the influence of heat and pressure.

WILLIAM W. SINGLETON.

REFERENCES CITED

The following references are of record in the file of this patent:

UNITED STATES PATENTS

| Number | Name | Date |
|---|---|---|
| 2,292,372 | Gerlach et al. | Aug. 11, 1942 |
| 2,356,675 | Lachman | Aug. 22, 1944 |
| 2,001,632 | Schlichting | May 14, 1935 |
| 2,352,900 | Kincaid | July 4, 1944 |